(12) United States Patent
Wilson

(10) Patent No.: US 7,554,828 B2
(45) Date of Patent: Jun. 30, 2009

(54) POWER CONVERTER WITH RETRACTABLE CABLE SYSTEM

(75) Inventor: John Wilson, Phoenix, AZ (US)

(73) Assignee: iGo, Inc., Scottsdale, AZ (US)

(*) Notice: Subject to any disclaimer, the term of this patent is extended or adjusted under 35 U.S.C. 154(b) by 0 days.

(21) Appl. No.: 10/996,655

(22) Filed: Nov. 24, 2004

(65) Prior Publication Data

US 2005/0117376 A1 Jun. 2, 2005

Related U.S. Application Data

(63) Continuation-in-part of application No. 10/623,060, filed on Jul. 18, 2003, now Pat. No. 6,903,950, which is a continuation-in-part of application No. 10/384,263, filed on Mar. 7, 2003, now Pat. No. 6,791,853, which is a continuation-in-part of application No. 10/225,933, filed on Aug. 22, 2002, now Pat. No. 6,650,560, which is a continuation-in-part of application No. 10/159,910, filed on May 31, 2002, now Pat. No. 6,751,109, which is a continuation-in-part of application No. 10/005,961, filed on Dec. 3, 2001, now Pat. No. 6,643,158, said application No. 10/623,060 is a continuation-in-part of application No. 10/072,074, filed on Feb. 8, 2002, now Pat. No. 6,700,808.

(60) Provisional application No. 60/525,257, filed on Nov. 26, 2003.

(51) Int. Cl.
*H02M 1/00* (2007.01)
(52) U.S. Cl. .................................................. 363/146
(58) Field of Classification Search .............. 363/142, 363/146; 320/111; 174/50, 53, 59
See application file for complete search history.

(56) References Cited

U.S. PATENT DOCUMENTS

| | | | | |
|---|---|---|---|---|
| 6,402,546 B1 * | 6/2002 | Groves et al. | ............... | 439/501 |
| 6,433,274 B1 * | 8/2002 | Doss et al. | ..................... | 174/50 |
| 6,623,294 B2 * | 9/2003 | Tse et al. | ..................... | 439/501 |
| 6,909,259 B2 * | 6/2005 | Chung | ........................ | 320/107 |
| 6,926,130 B2 * | 8/2005 | Skowronski | ........... | 191/12.2 R |

* cited by examiner

*Primary Examiner*—Adolf Berhane
(74) *Attorney, Agent, or Firm*—Snell & Wilmer LLP

(57) ABSTRACT

A modular power converter including a first housing enclosing a converter circuit, and a selectively detachable second housing enclosing a retractable power cable. In a first orientation the detachable second housing is secured to the first housing to form a unitary housing. In a second orientation, the second housing is detached from the first housing such that a first end of the extended power cable may tether to the first housing output a selectable distance therefrom. The cable also has a second end extendable from the second housing a predetermined distance. This modular power converter forms a single compact device when the power cable is not extended from the second housing.

13 Claims, 11 Drawing Sheets

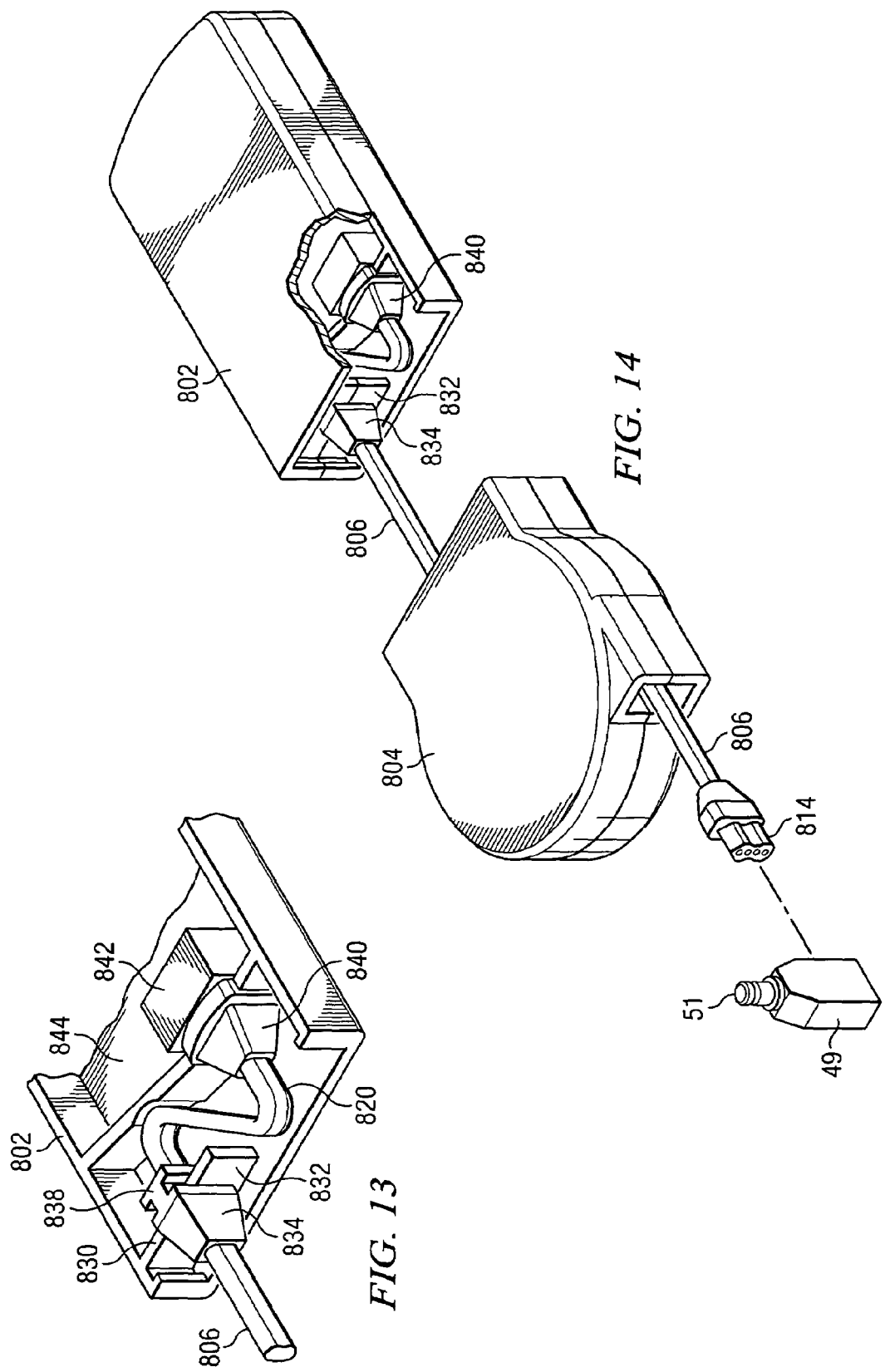

US 7,554,828 B2

POWER CONVERTER WITH RETRACTABLE CABLE SYSTEM

CROSS REFERENCE TO RELATED APPLICATIONS

This application claims priority from U.S. Provisional Patent application Ser. No. 60/525,257 entitled Retractable Cable System for Power Converter filed Nov. 26, 2003, and is a continuation-in-part of U.S. patent application Ser. No. 10/623,060 filed Jul. 18, 2003 now U.S. Pat. No. 6,903,950, which is a continuation-in-part of U.S. patent application Ser. No. 10/384,263 filed Mar. 7, 2003 now U.S. Pat. No. 6,791,853, which is a continuation-in-part of U.S. Ser. No. 10/225,933 filed Aug. 22, 2002 now U.S. Pat. No. 6,650,560, which is a continuation-in-part of U.S. patent application Ser. No. 10/159,910 filed May 31, 2002 now U.S. Pat. No. 6,751,109, which is a continuation-in-part of U.S. patent application Ser. No. 10/005,961 filed Dec. 3, 2001 now U.S. Pat. No. 6,643,158, and which U.S. patent application Ser. No. 10/623,060 is also is a continuation-in-part of U.S. patent application Ser. No. 10/072,074 filed Feb. 8, 2002 now U.S. Pat. No. 6,700,808, the teachings of which are incorporated herein by reference.

TECHNICAL FIELD OF THE INVENTION

The present invention generally relates to the field of power converters, and, more particularly to programmable power converters.

BACKGROUND OF THE INVENTION

As the use of mobile electronic products continues to increase, such as PC notebooks, PDAs, cellular telephones, MP3 players and the like, the need for low cost, compact power supplies and solutions to power and recharge these products also continues to increase. Most manufacturers of mobile products typically provide plug-in power adapters along with these mobile products to help provide the power supply needs of their customers.

Today's power adapters are typically AC-to-DC, or DC-to-DC power converters which are configured to convert an AC voltage to a DC voltage, or step-up or step-down the DC voltage input delivered to the mobile device. With AC-to-DC adapters, for example, users can power most mobile devices by simply plugging the adapter into a standard AC wall outlet commonly found in most homes and offices. Similarly, when only DC input power is available, such as in an automobile or airplane, users can still power their mobile devices by simply using a standard, off-the-shelf DC-to-DC adapter, such as with a cigarette lighter connector. Normally, both adapters are designed and tailored to provide a regulated DC output voltage, which voltage typically ranges from between 5 VDC to 30 VDC depending on the power requirements of mobile device being powered.

Although these power adapters conveniently provide direct power and recharging capabilities, users are often required to carry separate adapters to provide power to each individual mobile device. This often means that users have to carry multiple adapters for each device: one for an AC input power source, and another for a DC input power source. Moreover, users with multiple devices are typically required to carry multiple adapters to power all the multiple devices, thereby increasing the amount of bulk a user is required to carry, which is also tedious.

Accordingly, there exists a need for a power converter and system that resolves the system power management problems associated with carrying all of the different power supply components necessary to power a wide variety of mobile and portable devices having different power requirements. Moreover, there is a need for a power converter and system that reduces the space requirements for power cables, the possible tangling thereof, and improves the ease of use of the power converter by a user.

SUMMARY OF THE INVENTION

The present invention achieves technical advantages as a modular power converter including a first housing enclosing a converter circuit, and a selectively detachable second housing enclosing a retractable power cable.

In a first orientation of a first embodiment of the invention, the detachable second housing is secured to the first housing to form a unitary housing. In a second orientation, the second housing is detached from the first housing such that a first end of the extended power cable may tether to the first housing output a selectable distance therefrom. The cable also has a second end extendable from the second housing a predetermined distance. This modular power converter forms a single compact device when the power cable is not extended from the second housing, and reduces cable tangles and inconvenience.

BRIEF DESCRIPTION OF THE DRAWINGS

Advantages of the invention and the specific embodiments will be understood by those of ordinary skill in the art by reference to the following detailed description of preferred embodiments taken in conjunction with the drawings, in which:

FIG. 13 is a close up view of a cable strain relief; and

FIG. 14 is a perspective of the power converter of FIG. 8 selectively attachable to a tip connector adapted to connect to a portable electronic device.

DETAILED DESCRIPTION OF THE PREFERRED EMBODIMENT

The numerous innovative teachings of the present applications will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Figure 1A:
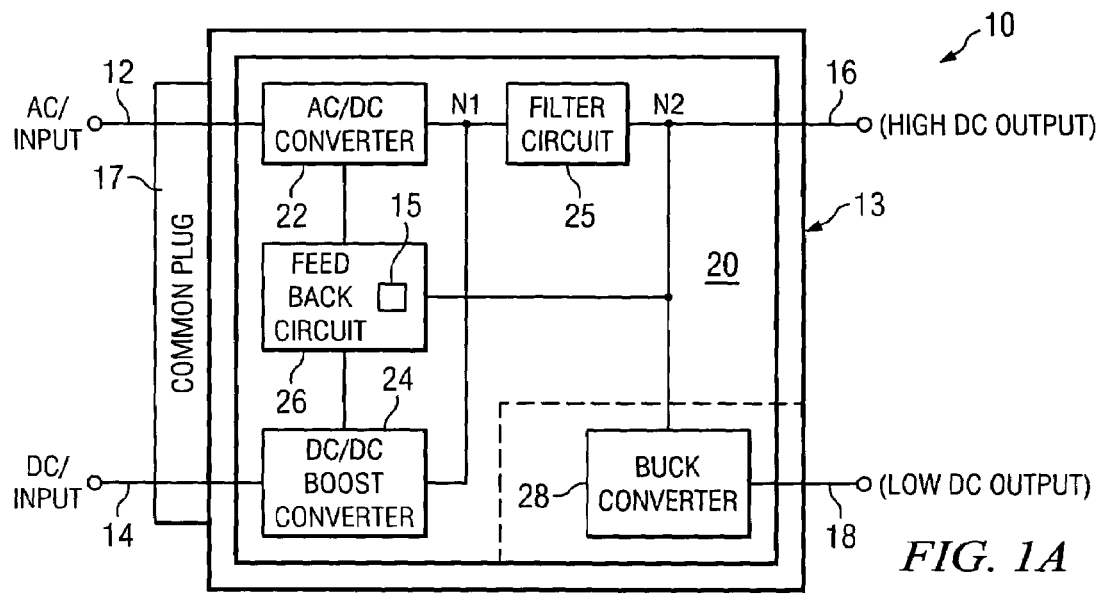
FIG. 1A shows a block diagram of a dual input AC and DC power converter having dual DC voltage outputs in accordance with the present invention.

There is shown in FIG. 1A a block diagram of a dual input AC/DC power converter 10 having dual programmable DC voltage outputs in accordance with the present invention. Preferably, the dual input AC/DC power converter 10 comprises a power converter circuit 20 having an AC-to-DC converter 22, a DC-to-DC booster converter 24, a feedback circuit 26, a filter circuit 25 and a DC-to-DC buck converter 28. The power converter circuit 20 is seen housed in housing 13 and advantageously provides a first programmable DC output voltage at DC output terminal 16 and a second programmable DC output voltage at terminal 18. Both of these DC output voltages may be generated as a function of both AC and DC input voltages.

In operation, the AC-to-DC converter 22 receives an AC signal via input terminal 12 and provides a regulated DC output voltage at node N1. Similarly, the DC-to-DC booster converter 24 may receive a DC input voltage at its input via input terminal 14 and may also provide a regulated DC output voltage at node N1.

Input terminals 12 and 14 are integrated into a single common connector 17 such that different power cords adapted to receive input power from different sources are received by the common connector 17. For instance, DC power from an airplane or car power source are wired to couple to input 14 and AC source is wired to couple to input 12. In a selected embodiment, the AC-to-DC converter 22 is adapted to generate a DC output voltage of between 15 VDC and 24 VDC in response to an AC input voltage at terminal 12 ranging between 90 VAC and 265 VAC. Likewise, the DC-to-DC booster converter 24 is adapted to provide a DC output voltage which is substantially similar to that of converter 22, but which is generated in response to a DC input voltage supplied at input terminal 14. Preferably, DC-to-DC booster converter 24 is adapted to receive a voltage in the range of between 11 VDC and 16 VDC. Advantageously, AC-to-DC conversion, via AC-to-DC converter 22, allows users of the power converter 10 to power high-power mobile devices, such as a laptop computer wherever AC input power is available, such as in the home or office, for example. Conversely, the DC-to-DC booster converter 24 of the power converter 10 is capable of powering similar high-power devices by stepping up most low amplitude DC input signals, such as those found in automobile and/or airplane environments.

As shown, filter circuit 25 has its input tied to the respective outputs of the converter 22 and 24. In a preferred embodiment, the filter circuit is adapted to provide a filtered DC output voltage at second node N2, which, thereafter, feeds output terminal 16, at an output power of 75 watts, for example.

The single feedback circuit 26 is shown coupled to the output of filter circuit 25 at node N2. In a preferred embodiment, the feedback 26 circuit, through a single feedback loop, regulates the voltage level of the filtered DC output voltages generated by both converters 22 and 24. Additionally, the feedback circuit 26 is adapted to receive a removable programming module that allows mobile device users to provide a selectable DC output voltage at output 16 via node N2. The programming module comprises a key 15 comprising a resistor, wherein different associated values of the resistor establish different associated DC output voltages at output 16. By allowing users to selectively change the voltage level of the filtered DC output voltage, the power converter 10 may be adapted to power a variety of different mobile electronic devices, having different associated power requirements. Moreover, the power converter's 10 programming module may also be adapted to provide the additional function of output current limiting.

Figure 1B:
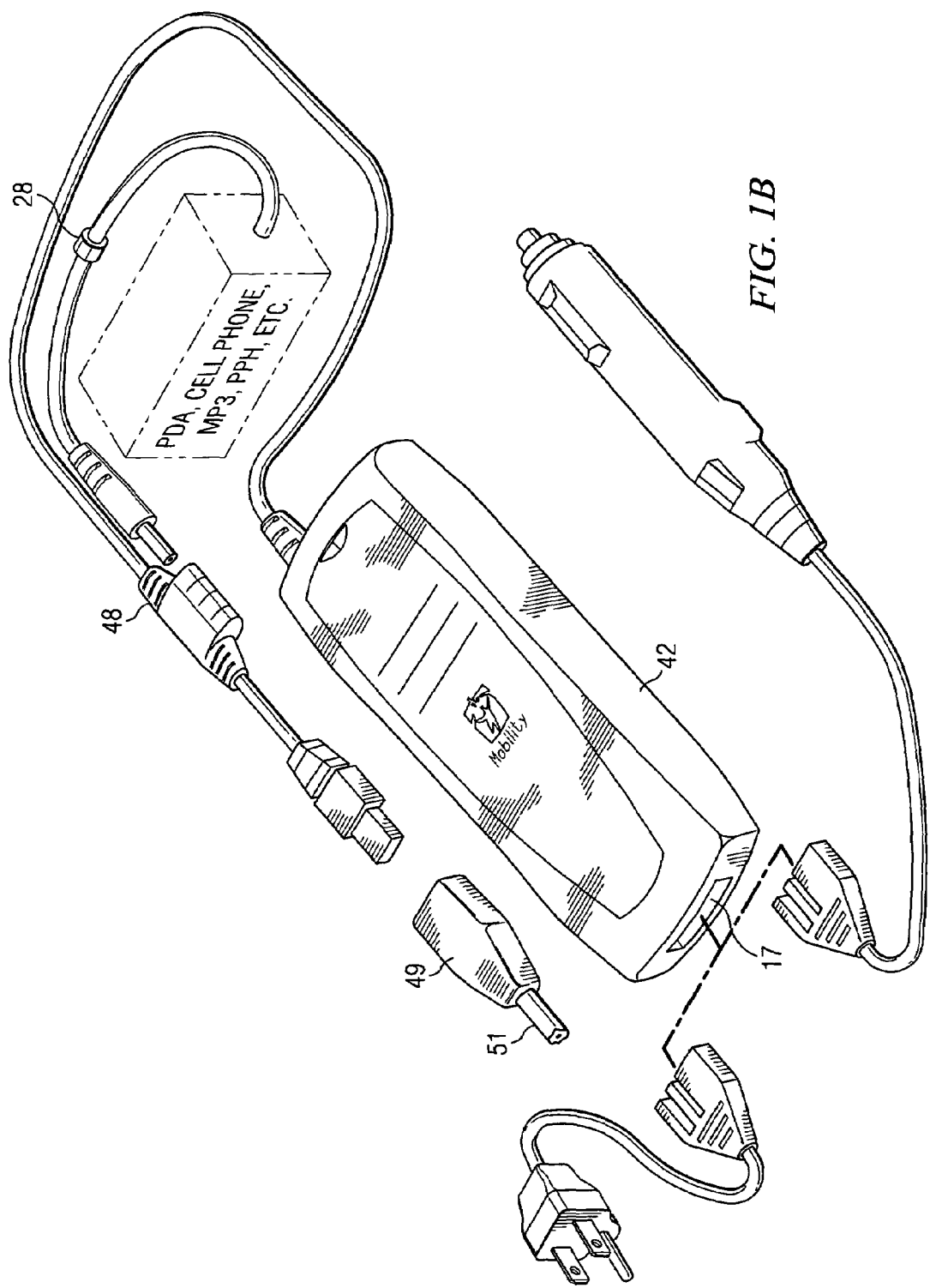
FIG. 1B shows an exploded view of the converter with the detachable buck circuit.

The DC-to-DC buck converter 28 has its input coupled at node N2, providing a second DC output voltage that is then fed to output terminal 18, having an output power of 10 watts, for example. Preferably, buck converter 28 discreetly steps down the filtered DC voltage and produces a second DC output voltage at a separate output terminal 18. In a selected embodiment, the buck converter 28 steps down the filtered DC output voltage to a range of about 3 VDC and 15 VDC. Advantageously, this second DC output voltage generated by converter 28 is independent of, and substantially lower than the DC output voltage at terminal 16. This allows users of the present invention to power not only a high-power peripheral, such as a laptop computer, but also, a second, low-power peripheral, such as a cell phone, PDA, and the like. Moreover, the present invention allows for these peripherals to be powered simultaneously by a single converter, regardless if the input voltage is AC or DC. The buck converter 28 is physically detachable from the main housing 13 as shown in FIG. 1B, allowing different buck circuits providing different output voltages to be selectively attached to housing 13 and tap the DC output voltage from output terminal 18.

Figure 2A:
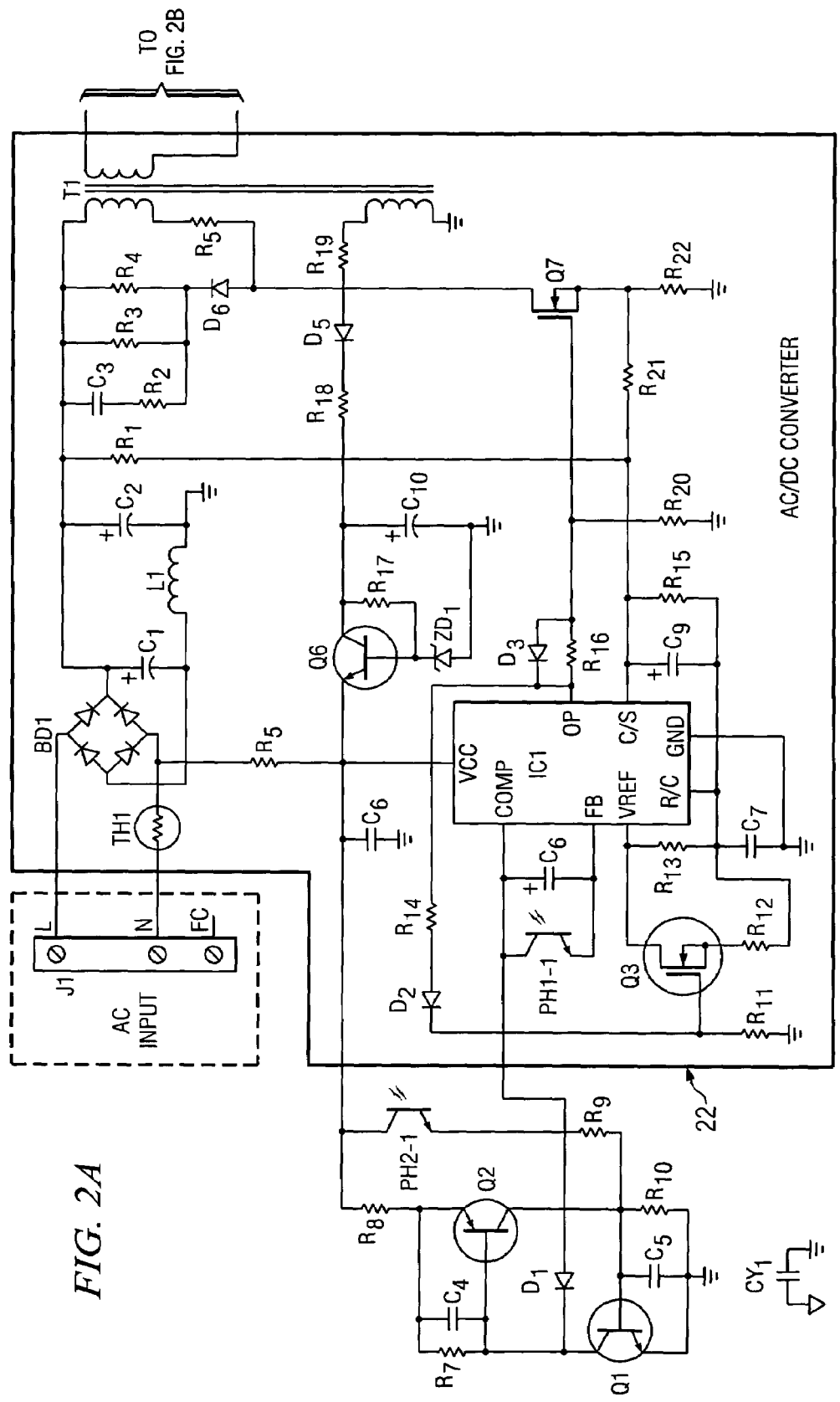
FIG. 2 shows a schematic diagram of the power converter circuit as illustrated in FIG. 1 in accordance with the present invention.
Figure 2B:
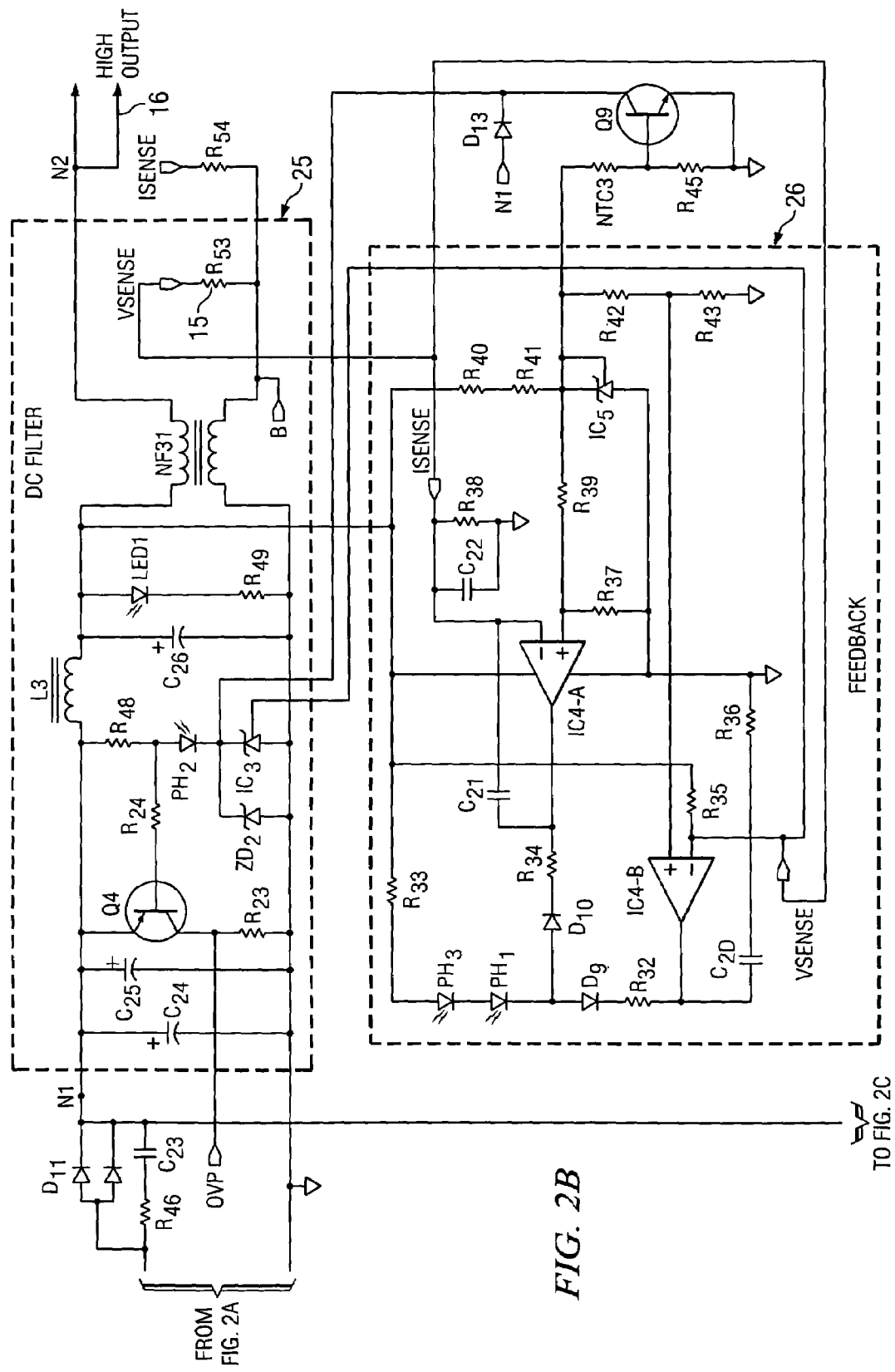
Figure 2C:
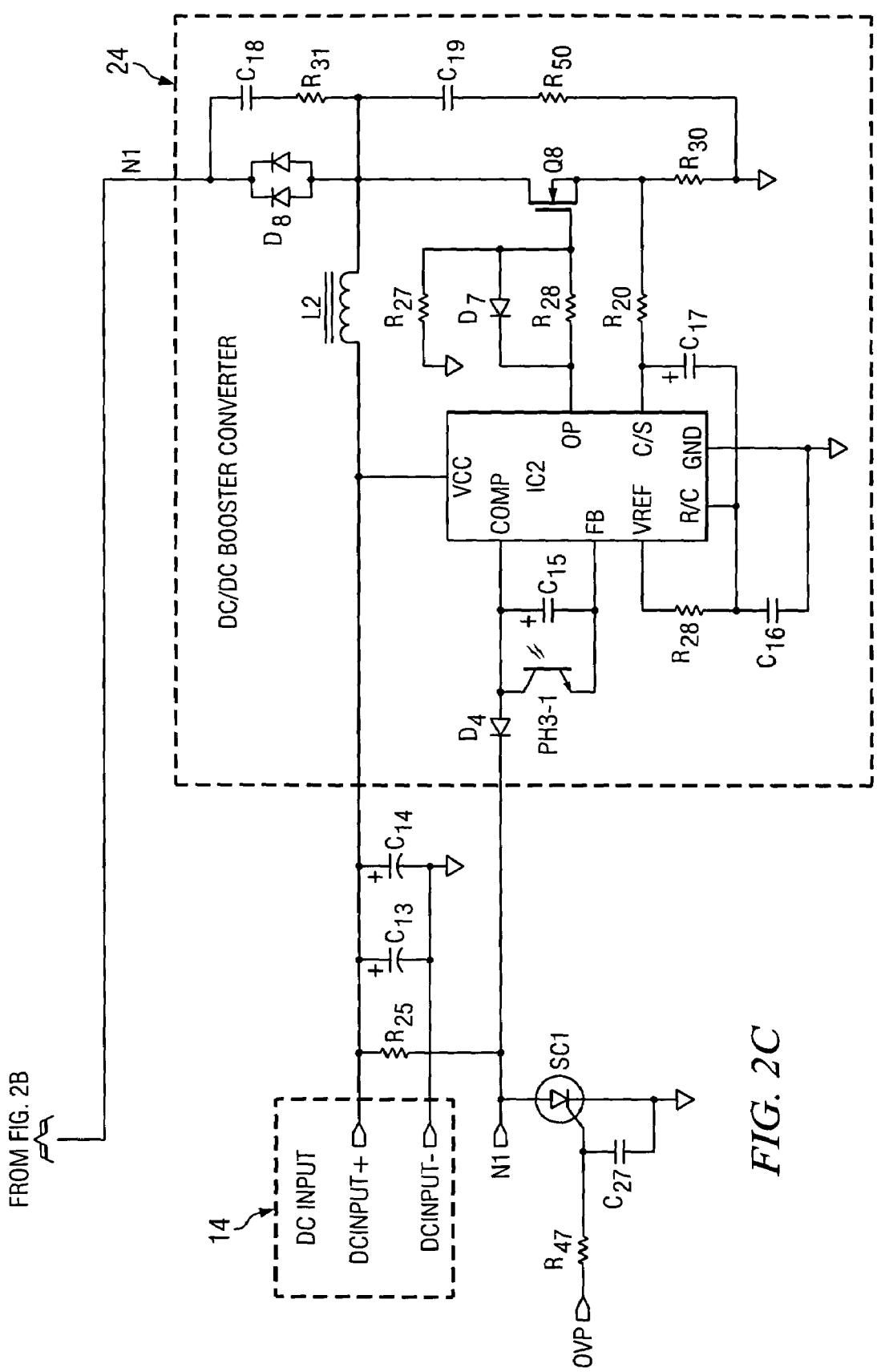

Referring now to FIG. 2 there is shown a schematic diagram of the power converter circuit 20 of the dual input AC/DC power converter 10 as depicted in FIG. 1 in accordance with an exemplary embodiment of the present invention. As described herein in greater detail, the power converter circuit 20, in a preferred embodiment, comprises three separate converters: AC-to-DC power converter 22, DC/DC boost converter 24, and DC-to-DC buck converter 28.

AC-to-DC Converter

The AC-to-DC power converter 22 includes a true off line switcher which is configured in a fly-back topology. Full-wave rectification of an AC input signal, received at input terminal 12, occurs using a full-wave bridge rectifier BD1 and a filter capacitor C1, which creates a DC voltage bus from which the switcher operates. Inductor L1 offers additional EMI filtering of the AC signal after the signal has been rectified through the full-wave bridge. The AC-to-DC converter 22 also includes a main controller IC1 configured as a current mode pulse-width modulator (PWM). Main controller IC1 is also configured to have a single-ended output with totem pole driver transistors coupled thereto. The AC-to-DC power converter 22 has a main power switch Q7 which drives the main transformer T1. In a preferred embodiment, the transformer T1, Schottky diode D11, and filter capacitors C24 and C25 combine to provide the DC output voltage at node N1.

As noted earlier, filter circuit 25 allows for additional filtering of the DC output voltage derived from node N1. The filter circuit 25 itself comprises inductor L3, capacitor C26 and transformer NF1. Advantageously, the filter circuit 25 produces a filtered DC output voltage at output 16 having less than 100 mv peak-to-peak noise and ripple.

The feedback circuit 26, through a single feedback loop, is capable of regulating the filtered DC output voltages provided by the converters 22 and 24. The feedback circuit 26 is also adapted to be coupled to a removable programming module having a key 15, comprising resistor R53. As such, the present invention allows users to selectively program the DC output voltage later received at output terminal 16. The feedback circuit 26 includes a photocoupler circuit comprising a pair of photocouplers PH1 and PH3 connected in series (i.e., stacked), each being coupled to the outputs of operational amplifiers IC4-A and IC4-B. Advantageously, these photocouplers are arranged along the feedback loop of the feedback circuit 26 with photocouplers PH1 and PH3 coupled respectively to converters 22 and 24. Through a single feedback loop, the feedback circuit 26 efficiently regulates the filtered DC output voltage provided at node N2. Moreover, by stacking the photo-couplers, the present invention also allows the power converter 10 to maintain proper input/output isolation between respective terminals 12 and 14 and output terminal 16.

Preferably, the output current limiting function of converter 22 is accomplished via integrated circuit IC4A, resistors R33, R37, R38, and R39 and programming resistor R54.

Over voltage protection of AC-to-DC converter 22 is achieved using photocoupler PH2 and zener diode ZD2. In a preferred embodiment, zener diode ZD2 is set at 25V such that when in avalanche mode it causes the transistor side of photocoupler PH2 to bias transistor Q1 into the on state. When it is the on state, transistor Q3 pulls low pin 1 of integrated controller IC1 and pulls the operating duty cycle of the integrated controller towards 0%. This takes the DC output voltage to 0 volts. Also, when transistor Q1 is on, transistor Q2 is also forced on which then forces these two transistors become latched. If transistors Q1 and Q2 are latched, input power must be recycled in order for the power converter 10 to be turned on again.

DC-to-DC Converter

The DC-to-DC converter 24 is configured in a boost topology and utilizes the same kind of integrated controller, IC2, as used in converter 22. In the DC-to-DC converter 24, transistor Q8 acts as the main power switch and diode D8 as the main rectifier. Preferably, inductor L2 is adapted to function as a power boost inductor, which is comprised of a toroid core-type inductor. It should be understood that the cathode leads of diodes D11 and D8 are connected, forming an ORed configuration, requiring only one output filter. Advantageously, this eliminates the board space needed for a second set of filter capacitors.

Like the AC-to-DC converter 22, the DC-to-DC converter 24 is also designed to operate at a frequency of around 80 KHZ. For the AC-to-DC converter 22, the operating frequency is set by resistor R13 and capacitor C7. Likewise, the operating frequency of the DC-to-DC converter 24 are set by resistor R28 and capacitor C16.

The DC-to-DC converter 24 includes an over-voltage protection circuit comprising zener diode ZD2, resistor R23, R24, R48, transistor Q4, and silicon-controlled rectifier SC1. Zener diode ZD2 sets the over-voltage protection point (OVP) which is preferably set at 25 VDC. Generally, there is no current flowing through resistor R48. If, however, when zener diode ZD2 begins to conduct current, the drop across R48 is significant enough to bias transistor Q4 on, pulling its collector terminal high, and thereby turning silicon controlled rectifier SC1 on. When silicon control rectifier SC1 is on, it pulls pin 1 of the integrated controller IC2 low. Thus, if pin 1 of integrated controller IC2 is low, the output drivers thereof are forced to operate at a duty cycle of 0%, thereby producing a DC output voltage of 0 volts at IC2 pin 6. Advantageously, the silicon controlled rectifier SC1 functions as a power latch circuit that requires that input power be recycled in order to turn on the power converter 10 if a voltage above 25 VDC is detected at node N1.

The temperature of the housing 13 of the power converter 10 is monitored using a thermistor NTC3. If, for example, there is a corresponding increase in the temperature of the housing 13, it will result in a decrease in the resistive value of thermistor NTC3, thereby causing transistor Q9 to turn on and pull low pin 1 of integrated circuit IC2 of converter 24. Moreover, this causes the photo-coupler PH2 to be biased enough to activate a latch circuit comprising transistors Q1 and Q2 that will shutdown the power converter 22. In addition, the power converter's 10 thermal protection feature is adapted to operate regardless of whether an AC or DC input voltage is being received at their respective input terminals.

Figure 3:
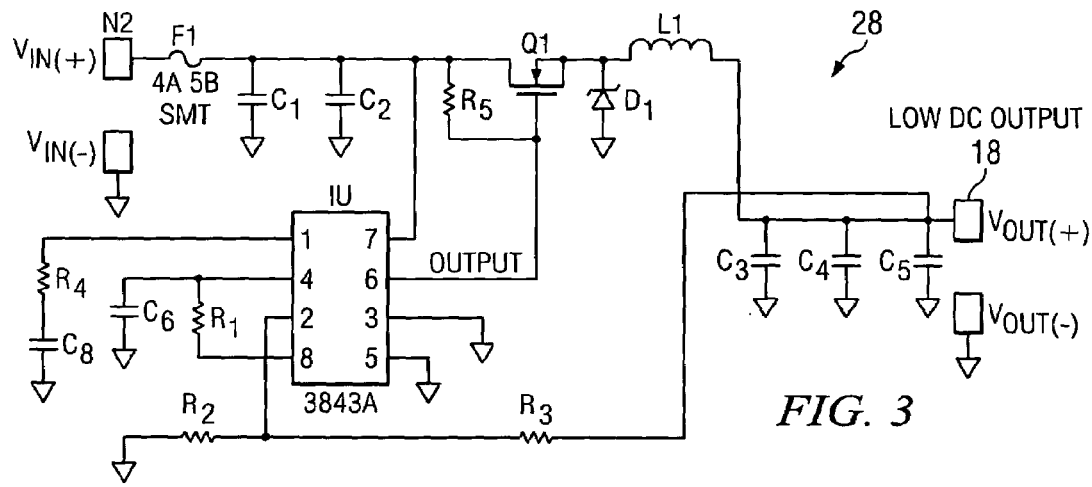
FIG. 3 shows a detailed schematic diagram of a DC-to-DC buck converter circuit in accordance with the present invention.

FIG. 3 shows a detailed schematic diagram of the DC-to-DC buck converter 28 in accordance with the present invention. The buck converter 28 has an integrated circuit controller IC1, similar to converters 22 and 24, which is adapted to generate an on-time duty cycle to power transistor switch Q1. The operating frequency of controller IC1 is set by capacitor C6, which is coupled between pin 4 of IC1 and ground, and resistor R1, which is coupled between pins 4 and 8. In a selected embodiment, the diode D1 functions comprises a Schottky diode and functions as "catch" diode. Inductor L1 is a output power inductor and couples the source of power transistor Q1 to $V_{out}$. Fuse F1 is shown coupled between $V_{in}$ and the drain terminal of power transistor Q1, and advantageously provides current protection to buck-converter 28.

Furthermore, the input $V_{in}$ of the buck converter 28 is coupled to the output of filter circuit 25 at node N2, wherein $V_{in}$ receives the filtered DC output voltage therefrom. In a preferred embodiment, the buck converter 28 provides a second DC output voltage at $V_{out}$, coupled to output terminal 18. Advantageously, the buck convert 28 discreetly steps down the filtered DC output voltage and provides a second DC output voltage at output terminal 18 which is independent of, and substantially lower than the DC output voltage at output terminal 16. Likewise, the DC output voltage of the buck converter 28 enables users of the present invention to power low-power peripherals, such as, cell phones, PDAs, and/or similar mobile devices. In a selected embodiment, the buck converter 28 may also be adapted to provide a DC output voltage at output terminal 18 ranging between 3 VDC and 15 VDC, selectively determined as a function of the chosen value of resistor R2 used in the particular buck converter 28, with a total power delivery of 10 watts, for example. As previously mentioned, the buck converter 28 may be housed in a separate, detachable program module that enables users to selectively program the DC output voltage at terminal 18 as a function of different associated buck converter modules.

Figure 4:
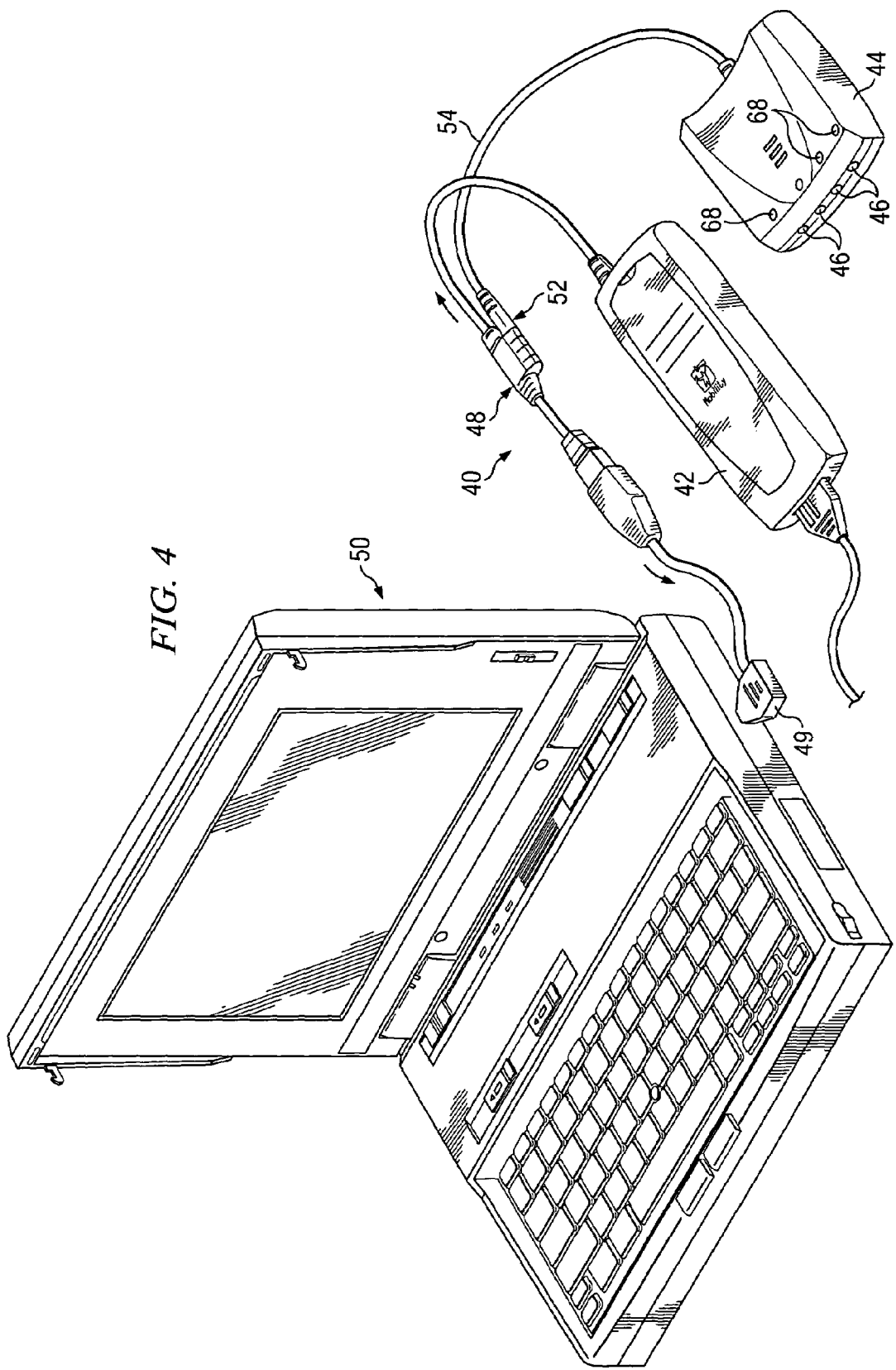
FIG. 4 is a perspective view of a power converter system including a power converter adapted to receive both an AC and DC voltage input, and a peripheral power hub (PPH) according to the present invention.

Referring now to FIG. 4, there is generally shown at 40 a perspective view of a peripheral power system (PPS) seen to include the AC/DC-to-programmable DC output converter 42 as shown and described in reference to FIGS. 1-3. In addition, PPS 40 is also seen to include a peripheral power hub (PPH) shown at 44 and having a plurality of DC voltage outputs generally shown at 46. As will be described in more detail shortly, in one preferred embodiment (FIG. 5) predetermined DC voltages are provided at each output which may then be converted by a buck circuit 28 associated with the peripheral device 72 to be powered. In another preferred embodiment (FIG. 6) each of these outputs 46 is programmable as a function of a removable programming key, such as a selectively replaceable programming resistor. Converter 42 provides a predetermined output DC voltage, which may be programmable, via a DC voltage coupler 48 to a primary device, such as a notebook computer 50, requiring a higher operating voltage and consuming a large amount of power, such as 45 watts. DC voltage coupler 48 also provides tapping of this output DC voltage provided to the primary device 50, which voltage is tapped via a connector 52.

Figure 5:
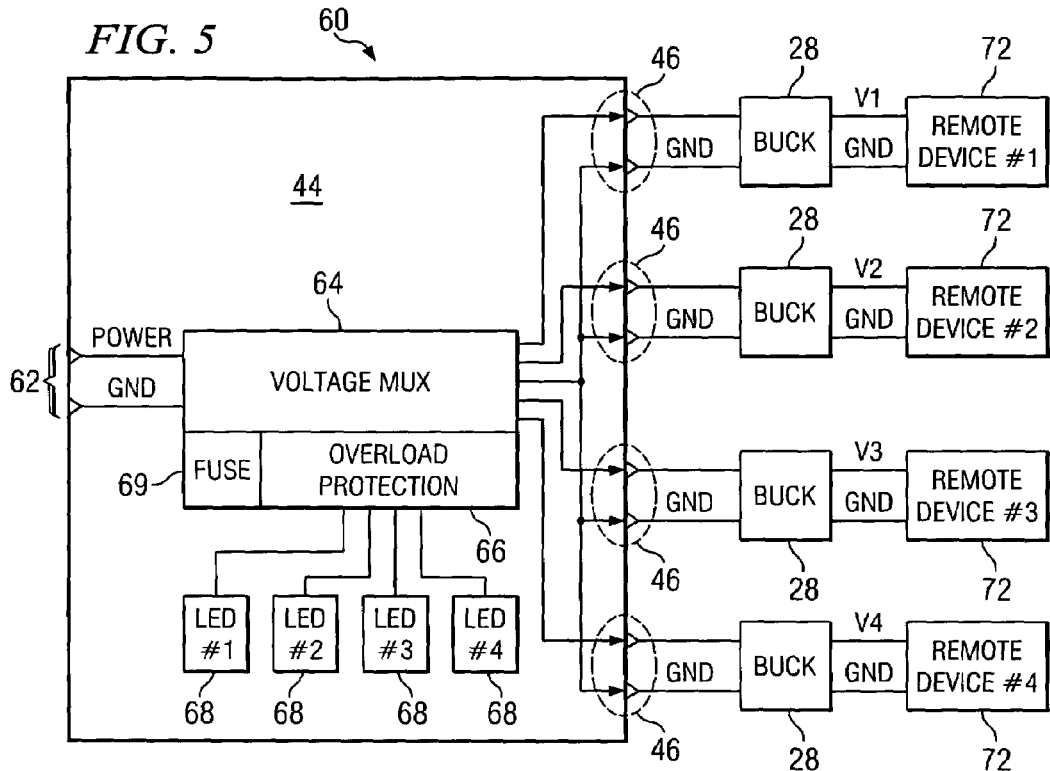
FIG. 5 is an electrical block diagram of one preferred embodiment of the PPH shown in FIG. 4, where each of the outputs of the PPH are connectable to an associated selectively attachable buck circuit providing a selectable voltage to an associated remote device.

In the embodiment shown at 60 in FIG. 5, the input voltage provided to input 62 is muxed to the plurality of output ports 46. The separate buck circuits 28 associated with and selectively coupled to the associated remote mobile device 72 convert this voltage to the final output voltages V1-V4 as shown in FIG. 5, which meets all the power needs of the associated mobile device 72. According to the embodiment shown at 70 in FIG. 6, the plurality of buck circuits 28 are integral to the PPH 44, each buck circuit 28 having a selectively removable programming key, shown as resistor R1, providing a programmable DC voltage to the respective output port 46 commensurate with the requirements of the associated remote mobile 72 device. Output ports 46 may be configured as simple pin type connectors, USB type connectors, and other configurations as desired. Again, the buck circuit 28 could be substituted with a boost circuit if desired to provide a higher voltage.

Turning now to FIG. 5, there is shown the first embodiment of the present invention comprising the PPH 44 shown in FIG. 4. As previously mentioned, the input DC voltage provided to the PPH 44 at input 62 is coupled to each of the output ports 46 by a voltage mux 64. This coupling of the input DC voltage to the multiple output ports 46 can be accomplished in a number of ways, such as via a simple resistive divide network, and may provide output-to-output isolation. In one implementation, the DC voltage provided at input 62 is directly provided to the output ports 46 for a subsequent down-stepping via the associated buck circuit 28. However, a lower voltage can be provided by the voltage mux 64 to each of the output ports 46 if desired. Voltage mux 64 is also seen to include an over load protection circuit generally shown at 66 which limits the amount of power that can be provided to each output port 46, such as 7 watts, to prevent overload of the PPH 44, and to prevent power hoarding at one output by its associated remote device 72 to the determent of the other remote devices 72.

Visual indicators 68 are provided to visually indicate the status of each output port 46. For instance, the LED 68 associated with each of the output 46 may be illuminated as green when power provided via output port 46 is below a predetermined limit, such as 7 watts each. If, however, a remote device 72 associated with the particular buck circuit 28 is attempting to draw more than the predetermined limit, the voltage mux 64 prevents providing power in excess of this predetermined limit, and also illuminates the associated LED as red indicating an attempted over power condition. Thus, a user can visually ascertain whether or not power being provided to the associated output port 46 is within an acceptable range as visually indicated by an associated green LED 68, or, that the associated remote device 72 is attempting to draw more than the predetermined limit. The voltage mux 64 also includes a main fuse 69 preventing excessive power draw of the PPH 44 itself, which could otherwise cause an overload condition to the power converter 42 or other input power source.

The advantages of the embodiment 60 shown in FIG. 5 include that a separate buck circuit 28 and the associated cord can be simply coupled to any of the output ports 46 and provide a programmable DC output voltage meeting ther needs of the associated remote device 72. A user having a buck circuit 28/cord for use with the particular remote device 72 can be plugged into any of the available output ports 46 of the PPH 44. The DC voltage is stepped down by buck circuit 28 external to the housing of PPH 44. This solution is low cost and a simple design.

Figure 6:
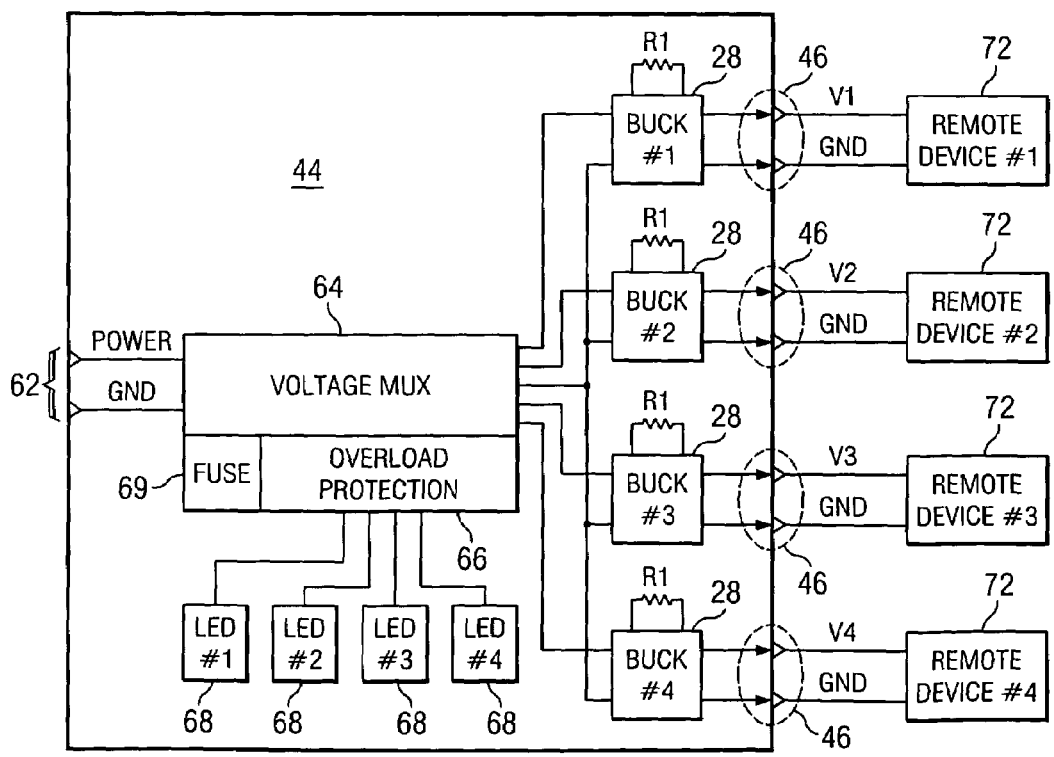
FIG. 6 is an electrical block diagram of another preferred embodiment whereby the PPH includes a plurality of programmable buck circuits, each having a selectively removable programming device, shown as a resister R1, whereby each remote mobile device can be directly coupled to a PPH output as shown.

Turning now to FIG. 6, there is shown at 70 another preferred embodiment of the present invention whereby a plurality of buck circuits 28 are provided within the PPH 44 to provide a programmable output DC voltage to the respective output port 46. Each buck circuit 28, as shown in FIG. 3, has an associated programming resister R1 which may be selectively removable from the PPH 44 to selectively establish the output DC voltage provided to the associated output port 46. Thus, the DC output voltage at each output port 46 is selectively programmable, and a remote device 72 need to only utilize a standard two conductor cord to couple to output port 46, as shown. Namely, one conductor couples the programmable output voltage V1, and the other conductor provides the ground. Again, each buck circuit 28 could be substituted with a boost circuit if desired.

Advantages of this embodiment 70 include that the buck circuits 28 are enclosed in the PPH 44, where each buck circuit 28 itself may be programmable using the associated programming resistor R1. In this arrangement, care must be taken that the remote device 72 is coupled to an output port having a desirable output voltage. Thus, the keys provide indicia of the output voltage being provided. The voltage mux 64 simply provides the input voltage at input 62 to each of the buck circuits 28, which may step down (or step up) the voltage thereat. Voltage mux 64 includes the overload protection circuit 66, the associated LED's 68, and the hub main fuse 69 as shown.

Both embodiments 60 and 70 provide a DC peripheral power hub adapted to power a plurality of unique remote devices 72 from a single unit 44, such remote devices including a cell phone, PDA, MP3 player, etc. This peripheral power hub 44 may be an accessory to power converter 42, or, a stand alone device receiving power. For instance, the input cord 52 feeding PPH 44 may be directly coupled to an output of converter 42, as shown in FIG. 4, tapped from the DC coupler 48 without any down stepping by a buck circuit 28, or directly coupled to a DC source, such as via a cigarette lighter outlet, or other input source.

Figure 7:
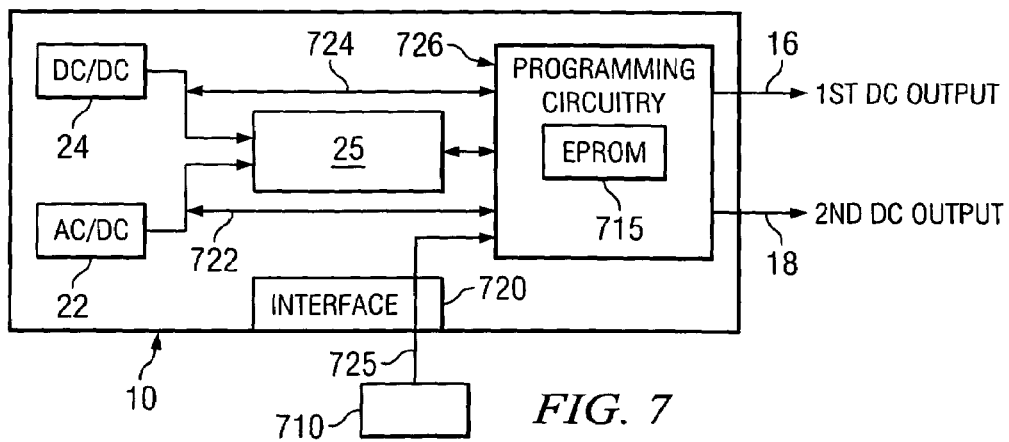
FIG. 7 illustrates a block diagram of a dual input AC and DC power converter having DC voltage outputs in accordance with exemplary embodiments of the present invention.

According to yet another preferred embodiment, as shown in FIG. 7, the power converter 10 include programming circuitry 726, such as a micro-controller (computer chip). The programming circuitry 726 is cooperable with converters 22 and 24, and filter 25 for effectuating a program for setting the electrical parameters associated with the output signals 16 and/or 18, such as the output voltage, output current, output power, current limit, polarity, over voltage protection threshold, and/or other electrical parameters associated with each of the output signals 16 and 18. Programming signaling/feedback occurs through communication lines 722 and 724. For example, the converter 10 with a micro controller inside, adjusts the numerical value of sensing resistor(s) or reference voltage(s) (shown in FIGS. 2 and 3) to effectuate a determined output voltage(s), output current(s) or output power. The programming circuitry 726 can include memory 715 for data and program storage, hardware, and/or software which enables start-up and control for effectuating the above-mentioned electrical properties. In a preferred embodiment, the programming circuitry 726 is powered from the converted signal of either converters 22 or 24.

Data indicative of electrical parameter selection is storable by the programming circuitry 726 in memory 715, such that on a power-up condition the data is read and the associated electrical parameters of the signal output 16 and/or 18 are effectuated by the programming circuitry 726. This data can be programmed into the programming circuitry 726 and subsequently into the memory 715 from outside the power supply unit. That way, by changing the data that is provided to the programming circuitry 715 and memory, the characteristics of the supplied signal can be changed at will. For example, the data can be provided to the programming circuitry 726 at the time of production or by an OEM vendor who might stock standard power supply units and then program each one for a specific customer's needs. This process would be akin to activating a new cell phone with the customer's information. The data can also be provided by the peripheral device 72 to be powered, such that the device 72 programs the programming circuitry 715 to effectuate electrical parameters required for the device 72.

The data can be provided from a source 710 external to the converter 10 (such as a program controller) via a simple 2 pin connector, infra-red or visible optical signaling, magnetic induction, acoustic signaling, etcetera. Transmission mediums 725 for communication between the external source 710 and the converter 10 include both wired mediums (such as coaxial cable, twisted pair wire, fiber-optic cable) and wireless mediums. The converter 10 can also include an interface 720 for interfacing between the different signaling types and transmission mediums, and the programming circuitry 715. Thus, as can be understood, the converter 10 can be programmed via communication systems such as the Internet to deliver data, analog and/or digital, from an external source to the converter 10.

In yet another exemplary embodiment, the programming circuitry 726 includes an EPROM 715 which forms a portion of the circuitry. The EPROM 715 can be permanently affixed in the converter 10 or selectively insertable into, and removable from an EPROM socket (i.e., keyway). The EPROM is programmed external of the converter 10 (using an EPROM burner, for example), and then inserted into the socket to effect the desired output characteristics. Advantageously, the EPROM chip could be programmed at the time of purchase, and then installed by a salesman into the converter. Advantageously, several EPROM chips can each be programmed for different output characteristics and selected from and inserted as the intended use changes. An EEPROM may also be utilized in place of the EPROM to prevent the need to install different EPROMS for different output programming.

Figure 8:
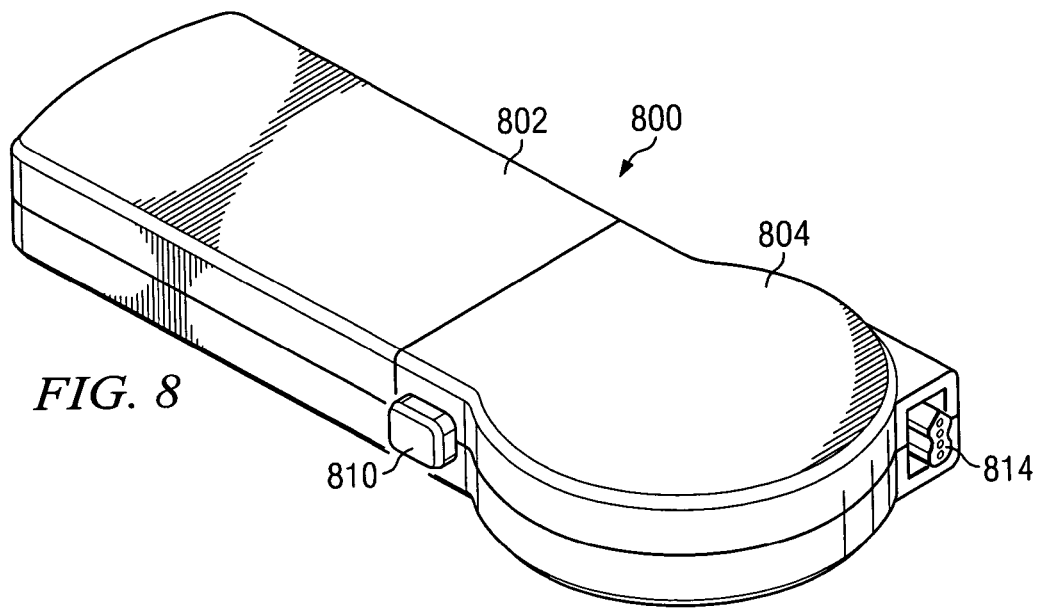
FIG. 8 is a perspective view of a first embodiment of a power converter having a selectively detachable second housing including a retractable electrical cable.
Figure 9:
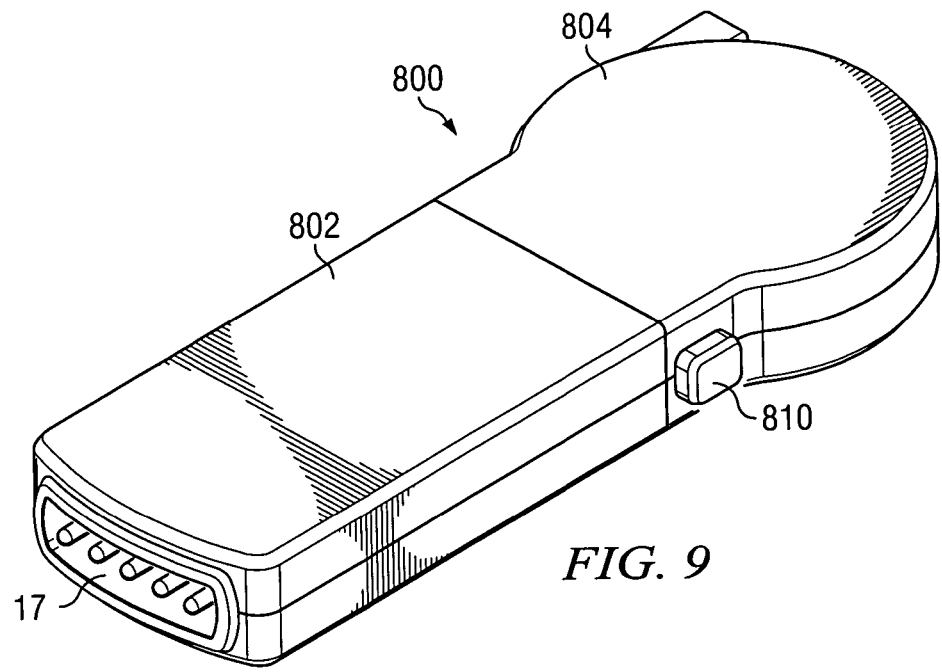
FIG. 9 is another perspective view of the embodiment of the power converter shown in FIG. 8.

Turning now to FIG. 8, there is shown generally at 800 a power converter according to another preferred embodiment of the present invention. Power converter 800 is seen to include a first housing 802 enclosing power converter circuitry 10 without the buck converter 28 and associated output 18, and a detachable second housing 804 having a dual retractable electrical cable 806 therein. In a first configuration, second housing 804 is adapted to be mechanically secured to the first housing 802 as shown in FIG. 8 and FIG. 9 to form a unitary housing. In a second configuration, the second housing 804 is adapted to be selectively disengaged from the first housing 802 while still being tethered to the first housing via the electrical cable 806. In a preferred embodiment, the electrical cable 806 comprises three electrical conductors including a positive DC line, a reference signal line communicating a feedback control signal, and a control signal line, such as previously described with reference to FIG. 2B.

With reference to FIG. 8, there is shown a release button 810 adapted to release a locking mechanism positively securing the second housing 804 to the first housing 802 upon displacement thereof. Also shown is a connector 814 at a second end 812 of electrical cable 806 adapted to selectively connect to a device connector, such as a programming a connector 49 enclosing a passive electrical component, such as a resistor R53.

Referring now to FIG. 9, there is shown a rear portion of the converter 800 depicting the common connector 17 adapted to receive either an input power cord adapted to provide AC power to three of the connector pins, or an input cord adapted to provide DC power to two of the connector pins as shown in FIG. 1B.

Figures 10, 12:
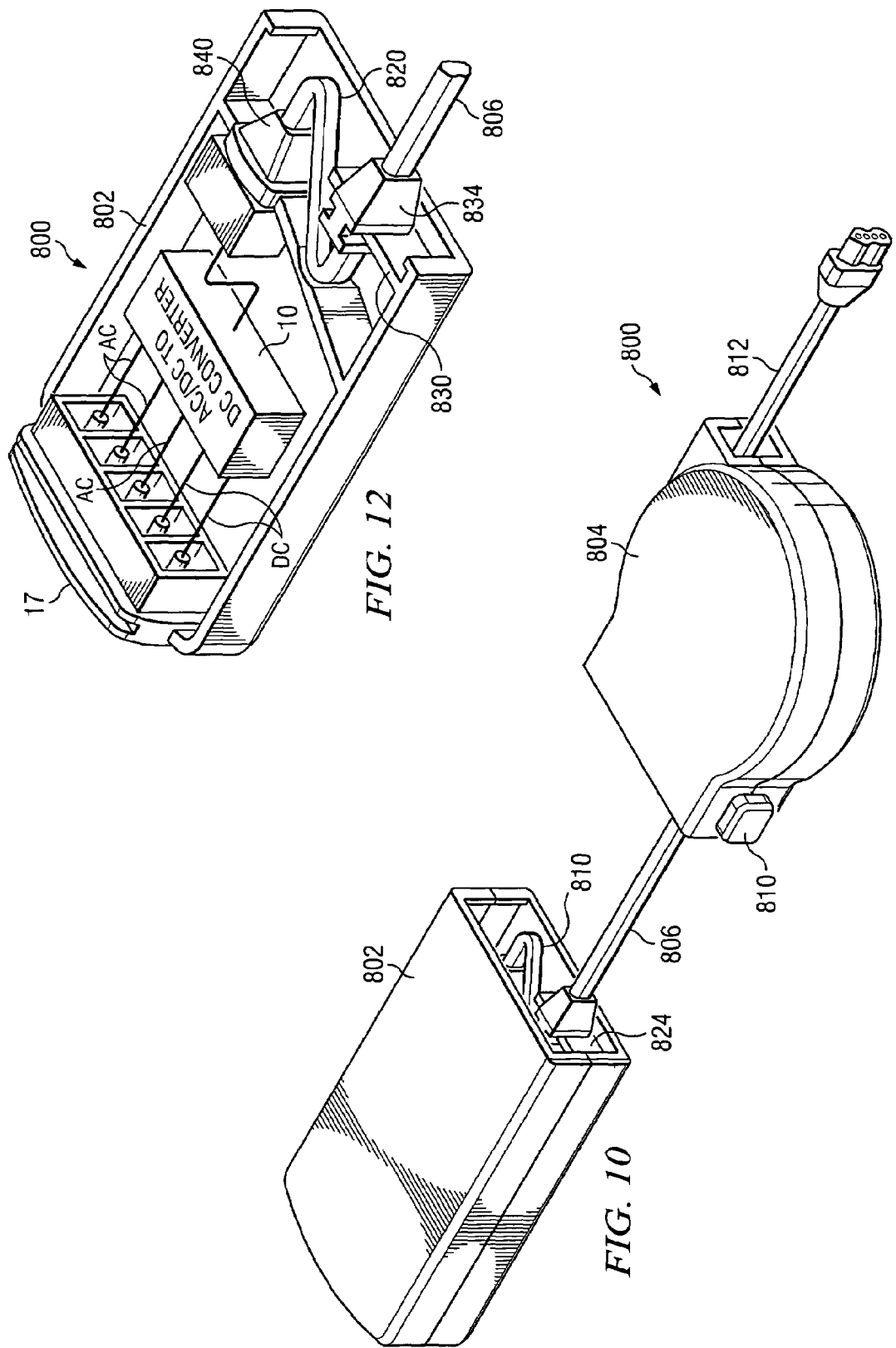
FIG. 10 is a perspective view of the power converter of FIG. 8 in the extended position.
FIG. 12 is a perspective view of the first housing enclosing the converter circuitry with the top removed therefrom.

Referring now to FIG. 10, there is shown the power converter 800 with the second housing 804 unlocked from and extended from the first housing 802 such that a first end 820 of the electrical cable 806, is tethered therebetween. Advantageously, either or both the first end 820 and the second end 812 of the retractable cable 806 can be selectively extended from, or retracted into, the second housing 804 so as to power a portable electronic device positioned closely proximate the power converter 800.

Different types of retractable cable mechanisms receiving power cable 806 may be employed within second housing 804, such as that shown in commonly assigned U.S. Pat. No. 6,433,274, the teachings of which are included herein by reference.

Figure 11:
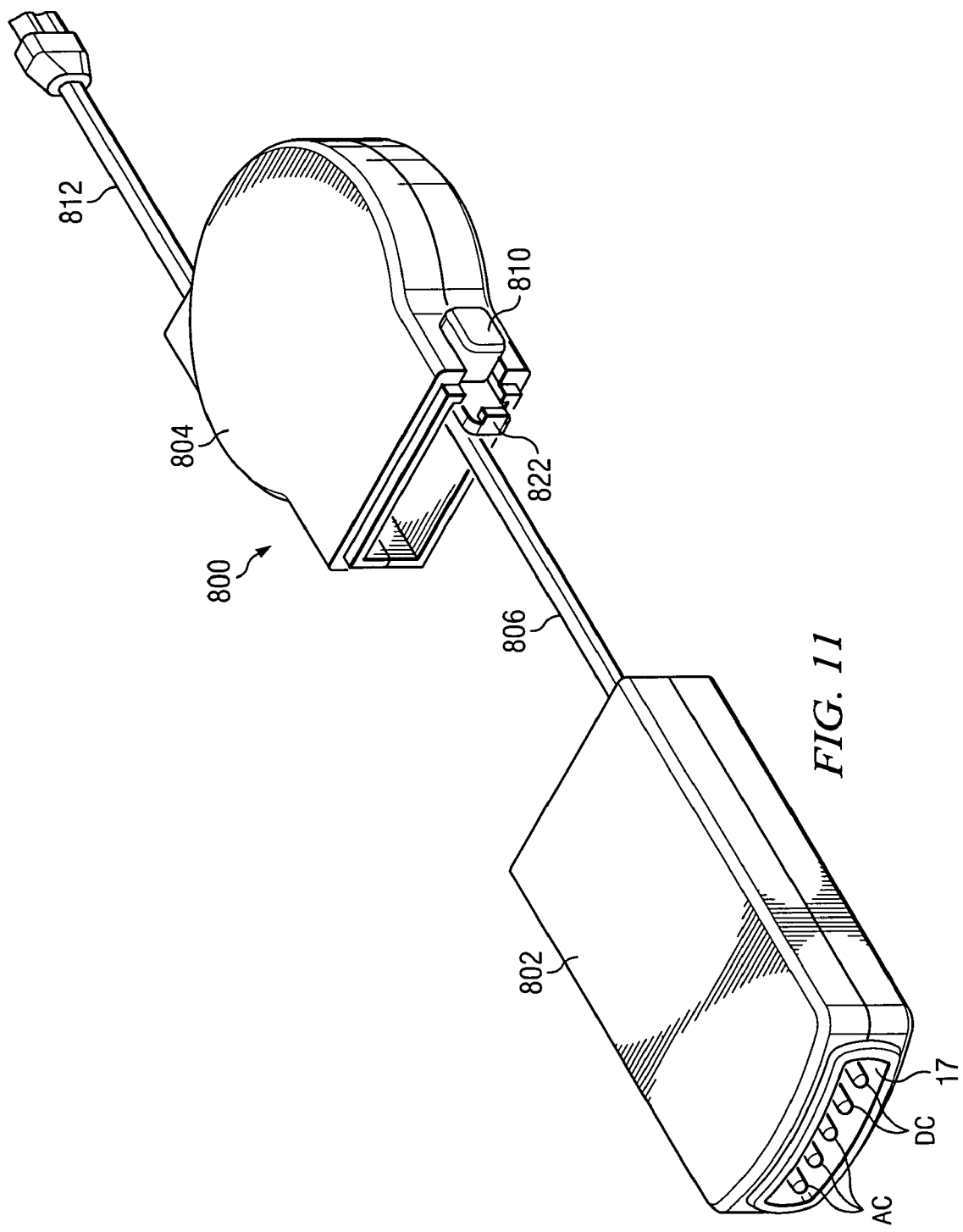
FIG. 11 is another perspective view of the power converter of FIG. 8 in the extended position.

Referring now to FIG. 11, there is shown the release device 810 having a locking tab 822 adapted to be received within the first housing 802 and positionable behind a corresponding flange portion 824 shown in FIG. 10. Preferably, locking tabs 822 is spring biased in the outward position such that upon connection of second housing 804 to housing 802, the locking tab 822 biases around and behind the corresponding locking tab 824.

Referring now to FIG. 12, there is shown a top view of the first housing 802 with a lid removed therefrom showing the positioning of the AC/DC to DC converter electronics 10 being deposed therein. Also shown in FIGS. 12 and 13 is a strain relief member 830 seen to comprise an upwardly extending notch 832 adapted to receive and engage a flanged portion 834 located proximate the second end 820 of the cable 806 to provide strain relief thereof. As shown in FIG. 13, the flange portion 834 has a radial extending flange portion 838 adapted to engage, while remaining behind, the notch 822 of strain relief member 830. Also shown is a connector 840 at the end of cable 806 providing electrical contact of the electrical conductors extending within cable 806 to a connector 842, which connector 842, in turn, is connected to the converter electronics 10. A Cavity 844 is seen in this view without the converter electronics 10.

Referring now to FIG. 14, there is shown an exploded view of the detectable programming connector 49 having a connector 51 adapted to mechanically and electrically couple to a portable electronic device (not shown).

Referring now back to FIG. 8, there is shown that the four outer surfaces of second housing 804 are flush with the four outer surfaces of first housing 802 in the connected arrangement. This provides for a sleek power converter, whereby just the second end 812 of the cable 806 can be extended therefrom to couple to a connector tip 49 to power a portable electronic device. As shown in FIG. 10, when it is desired to connect the converter 800 to a portable electronic device positioned even more remote from the first housing 802, both ends 812 and 820 of the retractable cable 806 can be extended from second housing 804 to provide maximum extension length of the cable 806. Advantageously, only the needed amount of cable is extended from the housing 804 to avoid tangling of the exposed cable portions.

Though the invention has been described with respect to specific preferred embodiments, many variations and modifications will become apparent to those skilled in the art upon reading the present application. It is therefore the intention that the appended claims be interpreted as broadly as possible in view of the prior art to include all such variations and modifications.

What is claimed is:

1. A power converter, comprising:
    a first housing having a power converter circuit having an input adapted to receive an input voltage and an output, the circuit adapted to convert the input voltage to an output voltage provided at the output; and
    a second housing selectively securable to the first housing to collectively form a unitary housing, the second housing having a retractable electrical cable mechanism disposed therein including a first retractable electrical cable having a first end being selectively extendable from the second housing and adapted to connect to the first housing output, and the retractable electrical cable mechanism having a second retractable electrical cable also selectively extendable from the second housing and having a second connector adapted to couple to a portable electronic device, wherein the first and second retractable cables are directly electrically connected to each other and configured to communicate a common same electrical signal.

2. The converter as specified in claim 1 wherein the electrical cable first end has a first connector adapted to selectively couple to the circuit output.

3. The converter as specified in claim 1 wherein the second connector comprises an electrical component adapted to selectively establish the output voltage at the circuit output.

4. The converter as specified in claim 3 wherein the electrical component selectively establishes a resistor in the circuit feedback loop to establish the selectable output voltage.

5. The converter as specified in claim 3 wherein the electrical component comprises a passive electrical component.

6. The converter as specified in claim 5 wherein the passive electrical component comprises a resistor.

7. The converter as specified in claim 1 wherein the circuit is adapted to power the portable electronic device.

8. The converter as specified in claim 1 wherein the first and second cable are coiled within the second housing.

9. The converter as specified in claim 1 wherein the second housing is adapted to positively lock to the first housing.

10. The converter as specified in claim 8 wherein the first and second housing each have a outer surface adapted to be flush with each other when the second housing is coupled to the first housing.

11. The converter as specified in claim 8 wherein the circuit converts a DC input voltage to a selectable output voltage.

12. The converter as specified in claim 8 wherein the circuit converts a DC input voltage or an AC input voltage to a selectable output voltage.

13. The converter as specified in claim 1 wherein the first housing has a member adapted to provide strain relief to the cable when coupled to the first housing.

* * * * *